(12) United States Patent
Feder et al.

(10) Patent No.: US 8,321,654 B2
(45) Date of Patent: Nov. 27, 2012

(54) METHODS FOR INITIAL BOOTSTRAP DURING ACTIVATION AND INITIAL CONFIGURATION OF USER TERMINALS IN NETWORK

(75) Inventors: Peretz Moshe Feder, Englewood, NJ (US); Paolo Narvaez, Wayland, MA (US)

(73) Assignee: Alcatel Lucent, Paris (FR)

( * ) Notice: Subject to any disclaimer, the term of this patent is extended or adjusted under 35 U.S.C. 154(b) by 561 days.

(21) Appl. No.: 12/153,486

(22) Filed: May 20, 2008

(65) Prior Publication Data

US 2009/0292909 A1 Nov. 26, 2009

(51) Int. Cl.
*G06F 9/00* (2006.01)
*G06F 9/24* (2006.01)
*G06F 15/177* (2006.01)

(52) U.S. Cl. ............................................. 713/1
(58) Field of Classification Search ................ 713/1
See application file for complete search history.

(56) References Cited

U.S. PATENT DOCUMENTS

| | | | | |
|---|---|---|---|---|
| 6,636,894 | B1 | 10/2003 | Short et al. ............... | 709/225 |
| 7,007,080 | B2 | 2/2006 | Wilson ..................... | 709/221 |
| 7,103,641 | B2 * | 9/2006 | Brannock ................. | 709/217 |
| 7,603,562 | B2 * | 10/2009 | Flynn ........................ | 713/181 |
| 7,809,366 | B2 | 10/2010 | Rao et al. | |
| 2005/0060361 | A1 | 3/2005 | Chatrath et al. .......... | 709/200 |
| 2005/0075115 | A1 | 4/2005 | Corneille et al. | |
| 2006/0039561 | A1 * | 2/2006 | Ypya et al. ................ | 380/270 |
| 2006/0187858 | A1 | 8/2006 | Kenichi et al. ............ | 370/254 |
| 2006/0256731 | A1 * | 11/2006 | Jennings et al. ........... | 370/252 |
| 2007/0058545 | A1 | 3/2007 | Nookala et al. | |
| 2007/0061878 | A1 * | 3/2007 | Hagiu et al. ............... | 726/14 |
| 2007/0133763 | A1 | 6/2007 | D'Angelo et al. .......... | 370/93 |
| 2007/0283385 | A1 * | 12/2007 | Qiu et al. ................... | 725/34 |
| 2008/0022090 | A1 * | 1/2008 | Kishimoto ................. | 713/156 |
| 2008/0049649 | A1 * | 2/2008 | Kozisek et al. ............ | 370/310 |

FOREIGN PATENT DOCUMENTS

WO WO 00/63779 10/2000

OTHER PUBLICATIONS

U.S. Office Action dated Jul. 6, 2011, issue in co-pending U.S. Appl. No. 11/826,937.
U.S. Office Action dated Feb. 9, 2012 for related U.S. Appl. No. 11/826,937.
Stephanie Lin et al., "An Introduction to OMA Device Management," IBM, Oct. 31, 2006.
Ronald Kutschke, "Auto-Configuration Management in Home Networks," ALCATEL, 2006.
Jeff Bernstein & Tim Spets, "Technical Report: DSL Forum TR-069 CPE WAN Management Protocol," May 2004.
Ronald Kutschke et al., "Diplomarbeit: IM Studiengang Medieninformatik," ALCATEL, Mar. 31, 2006.
English Translation of "Diplomarbeit: IM Studiengang Medieninformatik," ALCATEL, Mar. 31, 2006.

(Continued)

*Primary Examiner* — Mohammed Rehman
(74) *Attorney, Agent, or Firm* — Harness, Dickey & Pierce

(57) ABSTRACT

Methods and devices for initial bootstrap of a user terminal are provided. The user terminal transmits at least one first message to an initial bootstrap server. The first message includes device management capability information for the user terminal. The initial bootstrap server selects a device management protocol to be used by the user terminal and sends the selected device management protocol to the user terminal in at least one second message.

20 Claims, 1 Drawing Sheet

OTHER PUBLICATIONS

International Search Report on Patentability for corresponding International Application No. PCT/US2008/008181 dated Oct. 9, 2009.
Adwankar S. et al., "Universal Manager and Seamless Management of enterprise Mobile and Nonmobile Devices," Mobile Data Management, pp. 320-331, Jan. 19, 2004.
Blush S. et al., "Radio Software Download for Commercial Wireless Reconfigurable Devices," IEEE Communications Magazine, IEEE Service Center, vol. 42, No. 3, pp. S26-S32, Mar. 1, 2004.
International Search Report for corresponding International Application No. PCT/US2008/008181 dated Jan. 14, 2009.
Written Opinion for corresponding International Application No. PCT/US2008/008181 dated Jan. 14, 2009.
U.S. Office Action dated Mar. 24, 2011 for co-pending U.S. Appl. No. 11/826,937.
U.S. Office Action dated Sep. 1, 2010 for co-pending U.S. Appl. No. 11/826,937.

* cited by examiner

METHODS FOR INITIAL BOOTSTRAP DURING ACTIVATION AND INITIAL CONFIGURATION OF USER TERMINALS IN NETWORK

CROSS-REFERENCE TO RELATED APPLICATIONS

This non-provisional U.S. patent application is related to U.S. patent application Ser. No. 11/826,937 to Peretz Feder and Paolo Narvaez, filed on Jul. 19, 2007, the entire contents of which are incorporated herein by reference.

BACKGROUND OF THE INVENTION

FIG. 1 illustrates a portion of a conventional communications network such as a WiMAX network. As shown, the conventional network includes a user terminal 100 in two-way communication with a subscription server 106 and a device management server 108. The two-way communication may take place over one or more wired or wireless links. The two-way communication may be performed using any suitable communication protocol (e.g., Internet Protocol, WiMAX, EV-DO, UMTS, etc.). Each of the subscription server 106 and the device management server 108 also communicate with a back office 110 via one or more wired or wireless links.

A back-office is a term used to describe various elements used by a service provider to handle subscriber information. In one example, back-office 110 may comprise a collection of servers and computers at a single or multiple network entities within a service provider's core network. Operations and processes performed at the back-office 110 may be performed as computer implemented processes with or without human operator intervention.

The user terminal 100 may be any electronic device capable of communicating over a wired or wireless packet-switched network such as a cellular phone, personal digital assistant (PDA), laptop computer, desktop computer, modem, residential gateway, set-top box, etc.

As shown in FIG. 1, the user terminal 100 includes a web browser or web client 102 and a device management client 104. The web client 102 communicates with the subscription server 106 and the device management client 104 communicates with the device management server 108.

Before the user terminal 100 is capable of accessing network services (e.g., multimedia services such as VoIP, Video, Internet, etc.) provided by a particular service provider, the user terminal 100 must be authorized and configured appropriately to do so. This is referred to as activation and initial configuration. Such activation and initial configuration over a wireless link is sometimes referred to as over-the-air (OTA) activation and initial configuration.

Conventionally, over-the-air activation and initial configuration of user terminal 100 includes three steps:
1) subscription;
2) bootstrapping; and
3) device management.

Subscription is the process by which a user subscribes to network services provided by a service provider via a user terminal. Bootstrapping is a process by which the service provider provides some initial user credentials to the user terminal after the subscription step is complete. Device management is a session in which the service provider downloads and continuously updates relevant device configurations for accessing the service provider's network services.

A conventional over-the-air provisioning process will be described with regard to the communication flow embedded in FIG. 1. In FIG. 1, the arrows and corresponding numbers refer to message or communication flows.

In FIG. 1, messages 1-4 are considered part of the subscription step, while messages 5-6 are considered part of the bootstrapping step. Message 7 begins a standard device management process, which is well-known in the art. Various existing standards protocols, such as simple network management protocol (SNMP), Open Mobile Alliance Device Management (OMA-DM), and Digital Subscriber Line Forum TR-069, may be used to provide device management.

Referring to FIG. 1, (at 1) the user terminal 100 transmits one or more messages to the subscription server 106 (also referred to as a web server) via the web client 102. The message may be well-known hyper-text-transfer-protocol (HTTP) messages. These messages may include subscription information, such as, the user's billing address, credit card information, etc.

Still referring to FIG. 1, upon receiving the subscription information from the user terminal 100, the subscription server 106 sends the user's subscription information to the back-office 110 (at 2).

The back-office 110 adds the user to a subscriber database, and upon completion, acknowledges that the subscription was successful by sending an acknowledgement message to the subscription server 106 (at 3). Upon receiving the successful subscription acknowledgement from the back-office 110, the subscription server 106 transmits a web page back to the web client 102 (at 4). The web client 102 indicates the successful subscription process to the user.

Still referring to FIG. 1, the back-office 110 then populates the provisioning/device management server 108 with user credentials for the newly subscribed user (at 5). The device management server 108 then pushes the supplied user credentials to the device management client 104 (at 6) thereby bootstrapping the user terminal 100. In response to receiving the user credentials, the device management client 104 contacts the device management server 108 to begin a device management session (at 7). As is well-known, some small variations in the conventional method illustrated in FIG. 1 may exist. For example, the server responsible for the bootstrapping steps (5 and 6) may be different from the server responsible for device management.

Within a network such as the networks shown in FIG. 1, multiple user terminals 100 may be physically located and served for their customers. Even though these devices are under physical control of the customer, the network operator still controls and manages these devices remotely via standard device management (DM) protocols such as OMA-DM or TR-069.

Typically, different types of user terminals or devices utilize different DM protocols. For example, home-based devices, (e.g., a set-top box or the like) typically use the TR-069 protocol, whereas mobile devices (e.g., a cell phone or the like) typically use an OMA-DM client. Along the same lines, a network operator supporting mobile devices will most likely support an OMA-DM infrastructure, while an operator supporting home devices will most likely support TR-069.

As network deployments converge, the differences between mobile devices and home devices become less clear. A number of user terminals or devices (e.g., WiMAX terminals, WiFi/cell phones, etc.) are both home-based and mobile. Accordingly, network operators are increasingly interested in deploying converged networks capable of accommodating both types of devices and including converged devices that offer both home and mobile functionality. To manage such a complex system of devices, network operators must be capable of accommodating devices with different types of DM clients.

A conventional approach to resolve this issue is to create a new unified DM protocol for all types of devices that would replace existing special-purpose DM protocols. But, replacing well-established DM protocols with a new protocol is relatively costly and difficult.

SUMMARY OF THE INVENTION

Example embodiments provide methods for accommodating different types of devices and device management (DM) protocols in a converged network. At least some example embodiments provide a relatively simple negotiation mechanism allowing a network operator to select the most appropriate device management (DM) protocol for a given device in a given network deployment.

At least one illustrative embodiment provides a method for initial bootstrap of a user terminal. According to at least this embodiment, at least a first message is received at an initial bootstrap server from the user terminal. The at least one first message includes device management capability information for the user terminal. The initial bootstrap server sends at least one second message to the user terminal in response to the received at least one first message. The at least one second message includes device management protocol information, wherein the device management protocol information is indicative of a device management protocol to be used by the user terminal.

At least one other embodiment provides a user terminal for accessing wireless network. The user terminal comprises a device management module configured to transmit at least one first message to an initial bootstrap server, the first message including device management capability information for the user terminal. The device management module is further configured to receive at least one second message from the initial bootstrap server. The at least one second message includes device management protocol information. The device management protocol information is indicative of a device management protocol to be used by the user terminal.

At least one other embodiment provides a method for initial bootstrap of a user terminal. The method includes: transmitting, by the user terminal, at least one first message to an initial bootstrap server, the first message including device management capability information for the user terminal, and receiving, at the user terminal, at least one second message from the initial bootstrap server, the at least one second message including device management protocol information, the device management protocol information being indicative of a device management protocol to be used by the user terminal.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
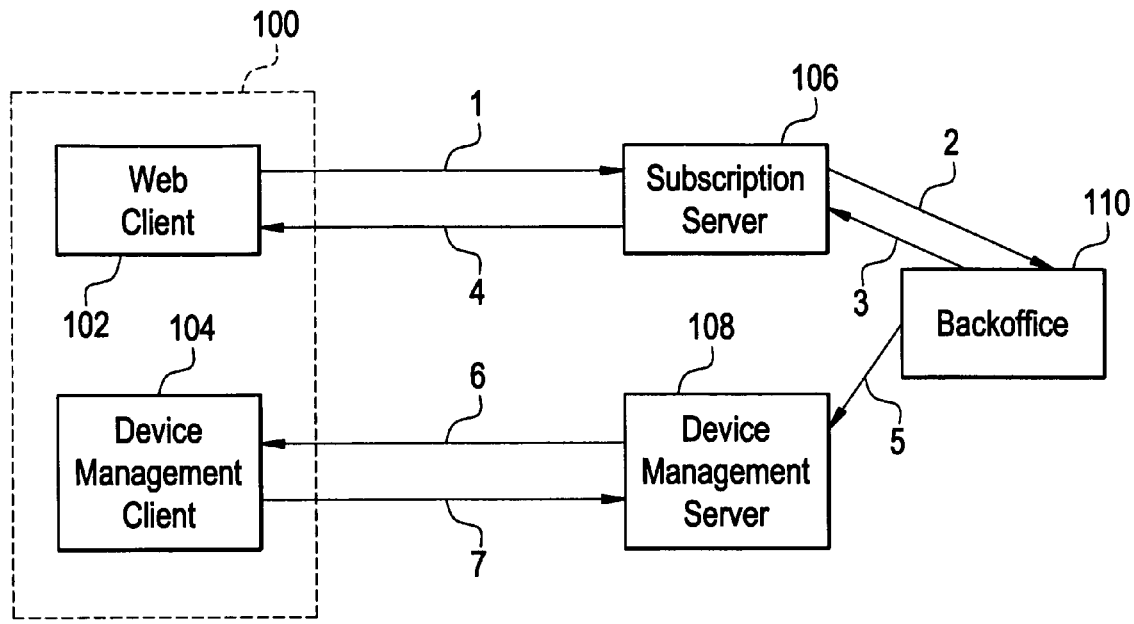
FIG. 1 illustrates a conventional network and communication flow diagram.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to at least some example embodiments, methods described herein may be performed concurrently or simultaneously with the above-described subscription portion of the over-the-air activation and initial configuration, but prior to the conventional bootstrapping portion. In at least some example embodiments, the methods described herein may be considered part of the bootstrapping portion of the portion.

Figure 2:
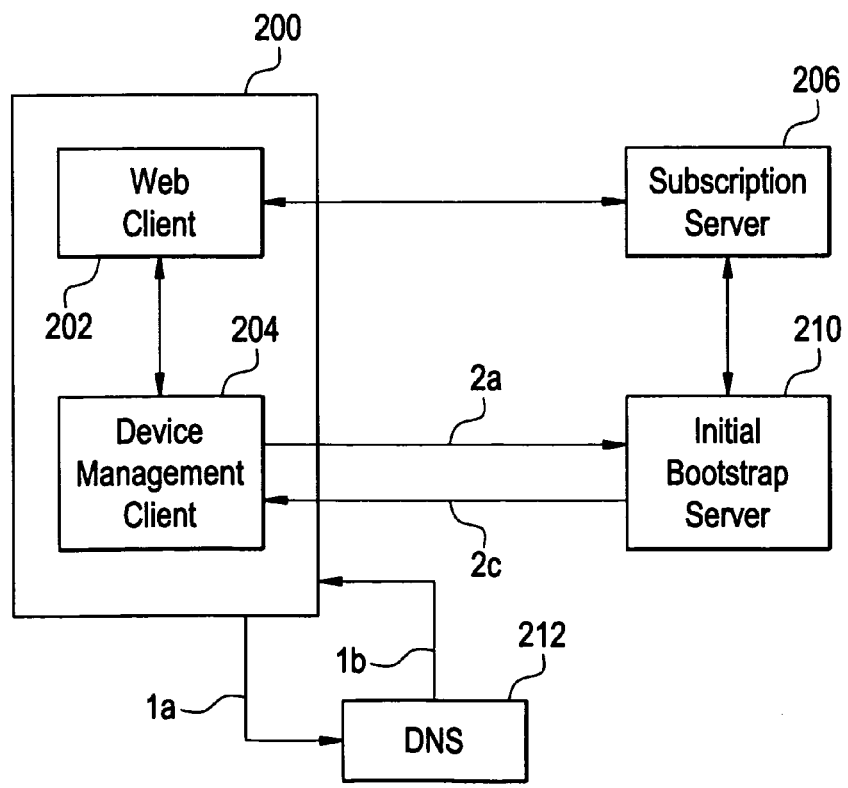
FIG. 2 illustrates a network and communication flow diagram according to an example embodiment.

FIG. 2 illustrates a portion of a communications network according to an example embodiment. Although example embodiments will be described with regard to the WiMAX protocol, example embodiments are applicable to other transport protocols such as TCP/IP, or wireless transport protocols used by Universal Mobile Telecommunications Standard (UMTS), Enhanced Video Data Only (EV-DO), Ultra Mobile Broadband (UMB), 3GPP Long Term Evolution (3GPP-LTE). Although example embodiments will be described with regard to wireless networks and network services, example embodiments may be equally applicable to wired, packet-switched networks and the like.

Referring to FIG. 2, the network includes a user terminal 200 in two-way communication with a subscription server 206, and an initial bootstrap (e.g., a WiMAX initial bootstrap (WIB)) server 210. The initial bootstrap server 210 may also be referred to as a device management protocol negotiation server. The user terminal 200 is also in two-way communication with a device management server (not shown). Because this device management server is the same as the device management server 108 shown and described with respect to FIG. 1 a description thereof is omitted.

As discussed herein, the initial bootstrap server 210 is a functional entity that enforces over-the-air (OTA) device management protocol for a particular network domain. Within a network, the initial bootstrap server 210 stores configuration bootstrap information, acts as a proxy to deliver the bootstrap information, or redirects the user terminal 200 to another server (e.g., another initial bootstrap server) to deliver the initial bootstrap information. More specific functionality of the initial bootstrap server 210 will be described in more detail below. A standard web server may be configured to act as the initial bootstrap server 210. Because standard web servers and manners in which they are configured are well-known, a detailed discussion will be omitted.

The user terminal 200 may communicate with the subscription server 206 and the initial bootstrap server 210 via one or more wired or wireless communications links. These communication links may use any suitable communication protocol (e.g., TCP/IP, or wireless transport protocols used by UMTS, EV-DO, UMB, LTE, WiMAX, etc.). Because these communication protocols such as TCP/IP, UMTS, EV-DO, UMB, LTE and WiMAX are well-known, a detailed discussion will be omitted.

Although only a single user terminal 200 is shown in FIG. 2, methods and processes discussed herein may be performed concurrently by a plurality of user terminals. That is, for example, each of the subscription server 206 and the initial bootstrap server 210 may communicate with a plurality of user terminals simultaneously or concurrently.

Still referring to FIG. 2, the subscription server 206 also communicates with a back-office (not shown) via one or more links (e.g., wired or wireless) using any suitable communications protocol. The back-office is the same as the back-office 110 shown in FIG. 1.

The user terminal 200 may be any electronic device having wireless (or wired) communication capability and may be capable of running a web client (or web browser) and device management client. For example, the user terminal 200 may be a cellular phone, personal digital assistant (PDA), smart phone, laptop computer, desktop computer, set-top box, residential gateway, modem, etc.

As shown, the user terminal 200 may include a web client 202 and a device management client 204. As is well-known in the art, web clients and device management clients may be implemented in the form of computer software. Herein, the web client may also be referred to as a web module, and the device management client may be referred to as a device management module. These terms may be used interchangeably.

Within the user terminal 200, the web client 202 communicates with the subscription server 206, whereas the device management client 204 communicates with the initial bootstrap server 210. In addition to the functionality described herein, the web client 202 and the device management client 204 are capable of performing the functions described above with regard to the web client 102 and device management client 104 of FIG. 1 and/or the functions of the device management client and web client described in co-pending U.S. patent application Ser. No. 11/826,937 to Feder et al. filed on Jul. 19, 2007.

A method for initial bootstrapping of a user terminal according to an example embodiment will be described with regard to the communication flow diagram embedded in FIG. 2. In FIG. 2, those arrowed lines between network elements not identified by reference characters indicate that the network components are capable of two-way communication with one another.

Illustrative embodiments enable discovery and negotiation of the device management protocol between a user terminal and the network. Generally, the procedure includes discovery of the initial bootstrap server 210 and initial bootstrap protocol negotiation between the user terminal 200 and the initial bootstrap server 210. The negotiation may be performed using the well-known hyper-text-transfer-protocol (HTTP).

Referring to FIG. 2, upon connection to the network, (at step 1a) the user terminal 200 queries domain name server (DNS) 212 (or a dynamic host configuration protocol (DHCP) server) to discover or locate the initial bootstrap server 210. For example, the user terminal 200 may send a DNS SRV query message as described in RFC 2782, "A DNS RR for specifying the location of services (DNS SRV)", Internet Engineering Task Force Network Working Group (February 2000), the entire contents of which are incorporated herein by reference. The query message requests the location of the initial bootstrap server 210. In one example, the query message may include the following string.

_wimax-bootstrap._tcp.operator.com

In the above example, the service is "wimax-bootstrap," and the protocol is "tcp." The domain name in the SRV query is the domain (e.g., "operator.com") of the target network service provider (NSP) if available. But, if the NSP is unavailable, the user terminal 200 may use the domain name obtained from a dynamic host configuration protocol (DHCP) procedure (e.g., DHCP option 15 described in RFC 2132, the entire contents of which are incorporated herein by reference). The DNS server 212 resolves this domain name to the uniform resource indicator (URI) of the initial bootstrap server 210 of the default NSP.

In response to the query message from the user terminal 200, the DNS 212 sends a server location message to the user terminal 200 (at step 1b). For example, the DNS 212 may send a DNS SRV response message as described in RFC 2782. The server location message indicates the location of the initial bootstrap server 210. In one example, the location message may include the following string.

wib.operator.com

If the user terminal 200 is unable to understand or fails to receive the DNS SRV response message, the user terminal 200 sends a new DNS SRV query to the DNS server 212. The user terminal 200 may resend the DNS SRV query until a maximum retry count is exhausted or until a DNS SRV response message is received and properly understood.

If the initial bootstrap server 210 location resolution is successful, the user terminal 200 opens an HTTP session (e.g., as described in RFC 2616, "Hypertext Transfer Protocol—HTTP/1.1," Internet Engineering Task Force Network Working Group (June 1999), the entire contents of which are incorporated herein by reference) with the initial bootstrap server 210. Through the HTTP session, the user terminal 200 informs or advertises the initial bootstrap server 210 of its supported device management (DM) protocol(s), and retrieves bootstrap information from the initial bootstrap server 210. This advertising and retrieval may be referred to as device management protocol negotiation.

Still referring to FIG. 2, in a more specific example, the user terminal 200 initiates the device management protocol negotiation by sending a device management capability information message to the initial bootstrap server 210 (at step 2*a*). The device management capability information message includes information regarding protocols supported by the user terminal 200. The user terminal 200 may also send other types of device capability information to the initial bootstrap server such as the model number of the device. This information is used by the initial bootstrap server to decide on the DM protocol and bootstrap information for the device.

In one example, the device management capability information message may be an "HTTP GET," message, which serves to advertise the capabilities of the user terminal 200 to the initial bootstrap server 210. The capabilities advertised in the HTTP GET message may include supported device management capabilities (e.g., OMA-DM, TR-069, etc.), manufacturer name, device model identification, etc. More generally, the device management capability message may include user terminal characteristics or parameters indicative of the capabilities of the user terminal.

More specifically, the HTTP GET message may include the following Request-URI:

"/bootstrap.wib?version=VERSION&msid=MAC&protocol={PROTOCOL}".

In this example, the user terminal 200 provides the medium access layer (MAC) address in the URI and indicates the initial bootstrap HTTP protocol version in the URI using the "version" parameter. The user terminal 200 provides a list of the supported provisioning protocols in the "PROTOCOL" parameter (as shown in Table 1 below).

TABLE 1

| PROTOCOL | VALUE |
| --- | --- |
| OMA DM | 0 |
| TR-069 | 1 |
| RESERVED | 2-65535 |

If the "PROTOCOL" parameter is not present, the initial bootstrap server 210 assumes that the user terminal 200 supports the OMA DM protocol. As noted above, the user terminal 200 may provide additional parameters, such as vendor and model of the user terminal, in the Request-URI. These parameters may be used by the user terminal 200 to notify the initial bootstrap server 210 of the vendor name and model ID of the user terminal itself. The user terminal 200 also provides an Accept Header (e.g., as defined in RFC 2616) containing the media type defined for the bootstrap (e.g., application/vnd.wmf.bootstrap).

Still referring to FIG. 2, in response to receiving the device management capability information message from the user terminal 200, the initial bootstrap server 210 sends an HTTP response message to the user terminal 200.

If, upon receipt of the device management capability information message, the initial bootstrap server 210 is capable of providing bootstrap information for the user terminal 200, the initial bootstrap server 210 selects an appropriate device management protocol for the user terminal 200. The initial bootstrap server 210 determines it is capable of providing bootstrap information to the user terminal 200 if the initial bootstrap server 210 recognizes at least one device management protocol identified in the device management protocol message.

The initial bootstrap server 210 selects the appropriate device management protocol based on the information included in the device management capability information message from the user terminal 212. The initial bootstrap server 210 may also select an appropriate device management protocol based on network policy at the initial bootstrap server 210. For example, if the user terminal 200 supports more than a single device management protocol, the initial bootstrap server 210 may select the appropriate device management protocol based on network policy.

A service provider may implement a network policy for device management based on its business needs. For example, certain home-based device types (e.g., customer premises equipment (CPE)) may be forced to use a DM protocol like TR-069 that is better suited to manage these types of devices, whereas other mobile-based device types (e.g., mobile handset) may be forced to use a DM protocol like OMA-DM that is better suited to manage the mobile functionality of the device.

Still referring to FIG. 2, in response to the device management capability information message, the initial bootstrap server 210 sends a device management protocol information message to the user terminal 200 (at 2*c*). If the initial bootstrap server 210 is capable of providing bootstrap information to the user terminal 200, the device management information protocol message indicates a selected protocol to be used by the user terminal 200 in subsequently connecting to the device management server (not shown) in the network. In one example, the device management protocol information message includes protocol specific bootstrap information regarding the selected protocol. If the initial bootstrap server 210 is unable to provide bootstrap information to the user terminal 200, the initial bootstrap server 210 redirects the user terminal 200 or reports a provisioning failure. Each of these situations will be discussed in more detail below.

Still referring to FIG. 2, the device management protocol information message may be in the form of an HTTP response. In the above case in which the initial bootstrap server 210 is capable of providing bootstrap information to the user terminal 200, the HTTP response message is an HTTP 200 OK message. The HTTP 200 OK message includes bootstrap information in the response body. The content-type of the reply may be, for example, "application/vnd.wmf.bootstrap"

In response to the HTTP 200 OK message from the initial bootstrap server 210, the user terminal 200 initiates the selected device management protocol based on the received bootstrap information. More generally, the protocol specific bootstrap information may be used in subsequent bootstrapping and device management procedures, such as those described above with regard to FIG. 1.

As noted above, if the initial bootstrap server 210 is unable to provide bootstrap information for the user terminal 200, the device management protocol information message (1) redirects the user terminal 200 to another server that is capable of providing bootstrap information or (2) indicates that provisioning has failed.

In case (1), the device management protocol negotiation message sent to the user terminal 200 is an HTTP 302 Found message. The HTTP 302 Found message includes the URI of the server capable of providing the bootstrap information. In one example, the redirect functionality may be used when an initial bootstrap server is too busy to offload work to another server. In this example, upon receiving the redirect, the user terminal 200 opens an HTTP session with the server indicated by the URI and uses the above-described HTTP GEI method to obtain bootstrap information from the newly identified server.

In case (2), if the initial bootstrap server 210 does not understand the request due to, for example, malformed syntax, corrupted packet, decode error, unsupported initial bootstrap protocol revision, etc., the device management protocol negotiation message is a 400 Bad Request. The 400 Bad Request message indicates the failure of the OTA provisioning procedure. In response to receiving a 400 Bad Request message, the user terminal 200 displays an error message to the user saying the procedure has failed.

Still referring to case (2), if the device management capability information message from the user terminal 200 identifies a provisioning protocol not supported by the associated network (e.g., WiMAX network) of the initial bootstrap server 210 or is not allowed for the user terminal 200 (e.g., a non-CPE device identified via MAC address requesting only TR-069 protocol), the device management protocol negotiation message may be an HTTP 403 Forbidden message. The HTTP 403 Forbidden message also indicates the failure of the provisioning procedure. In response to receiving a HTTP 403 Forbidden message, the user terminal 200 displays an error message to the user saying the procedure has failed.

Yet again with regard to case (2), if the initial bootstrap server 210 is unable to provide bootstrap information or redirect the user terminal 200 to another server, the device management protocol negotiation message may be an HTTP 404 Not Found message. The HTTP 404 Not Found message also indicates failure of the provisioning procedure. In response to receiving a HTTP 404 Not Found message, the user terminal 200 displays an error message to the user saying the procedure has failed.

After having completed the initial bootstrap procedure described above, a conventional bootstrapping and device management procedure (e.g., as described above with regard to FIG. 1) may be performed to complete the activation and initial configuration of the user terminal 200.

Successful execution of the subsequent bootstrapping process establishes a secure path between the device management client 204 and a device management server (not shown), and the protocol specific provisioning process for the device begins.

Illustrative embodiments may be implemented/added to existing devices having legacy device management clients without modification to the existing device management clients and/or servers. The protocol negotiation discussed herein, for example, may be performed prior to the conventional bootstrapping process and device management session and may be transparent to the device management protocol. The protocol negotiation may be performed before, after or concurrently with the conventional subscription process described above.

The negotiation mechanism described herein may be performed via a relatively simple HTTP handshake. The messaging may be more easily recognized and controlled by the network.

Because the device management protocol negotiation is initiated by the user terminal 200 and uses a standard HTTP port, the negotiation may traverse almost any standard firewall there between. The "pinhole," created by this exchange may be reused, for example, in the device management process.

In more detail, the user terminal 200 may initially contact the initial bootstrap server 210 via an external port or pinhole (e.g., through a firewall). The initial bootstrap server 210 server may send device management information to the user terminal 200 via the same external port or pin-hole through which the user terminal 200 initially contacted the initial bootstrap server 210. As is well-known in the art, firewall software may be configured to recognize and associate a particular external port or pin-hole with a particular source address, source port, destination address and destination port of the initial contact messages sent by the user terminal 200 to the initial bootstrap server 210.

The firewall software may recognize a message from the initial bootstrap server 210 to the user terminal 200 as having a source address, source port, destination address and destination port opposite to that of the source address, source port, destination address and destination port included in the initial message or messages from the user terminal 200. Once recognized as opposites, the firewall software may allow the messages from the initial bootstrap server 210 to pass through the firewall to the user terminal 200, and vice versa.

Illustrative embodiments provide a more universal mechanism to bootstrap the device management protocol. Once the network has identified the device management protocol to be used, the appropriate bootstrap parameters or characteristics may be sent to the device management client.

The invention being thus described, it will be obvious that the same may be varied in many ways. Such variations are not to be regarded as a departure from the invention, and all such modifications are intended to be included within the scope of the invention.

We claim:

1. A method for bootstrap of a user terminal, the method comprising:
    receiving, at a bootstrap server of a service provider, at least one first message from the user terminal, the at least one first message including an indication of at least one device management protocol supported by the user terminal prior to initialization of the user terminal; and
    sending, from the bootstrap server, in response to the received at least one first message, at least one second message to the user terminal, the at least one second message including device management protocol information, the device management protocol information being indicative of a selected device management protocol from among the at least one device management protocol to bootstrap a web client of the user terminal to a subscription web server to access network services from the subscription web server,
    the user terminal having not been activated for service by the service provider prior to the receiving and sending of the respective first and second messages.

2. The method of claim 1, wherein the device management protocol information includes at least one of (a) the selected device management protocol supported by the user terminal, (b) a manufacturer name, and (c) a device model identification for the user terminal.

3. The method of claim 1, wherein at least one of the first and second messages is a hyper-text transfer protocol message.

4. The method of claim 1, wherein the second message includes bootstrapping information associated with the selected device management protocol identified in the device management protocol information.

5. The method of claim 1, further comprising:
initiating the selected device management protocol identified in the second message using bootstrap information also included in the second message.

6. The method of claim 1, further comprising:
selecting the selected device management protocol from a plurality of device management protocols based on the indication of the at least one device management protocol included in the first message.

7. The method of claim 1, further comprising:
opening a pinhole through a first port of the bootstrap server in response to the first message; and wherein
the sending step sends the at least one second message to the user terminal through the pinhole in the first port.

8. The method of claim 7, wherein the at least one second message further includes subscription information.

9. A method for bootstrap of a user terminal, the method comprising:
transmitting, by the user terminal, at least one first message to a bootstrap server of a service provider, the first message including an indication of at least one device management protocol supported by the user terminal prior to initialization of the user terminal; and
receiving, at the user terminal, at least one second message from the bootstrap server, the at least one second message including device management protocol information, the device management protocol information being indicative of a selected device management protocol from among the at least one device management protocol to be used by the user terminal in accessing network services,
the user terminal having not been activated for service by the service provider prior to the transmitting and receiving of the respective first and second messages.

10. The method of claim 9, wherein the device management protocol information includes at least one of (a) the selected device management protocol supported by the user terminal, (b) a manufacturer name, and (c) a device model identification for the user terminal.

11. The method of claim 9, wherein at least one of the first and second messages is a hyper-text transfer protocol message.

12. The method of claim 9, wherein the second message includes bootstrapping information associated with the selected device management protocol identified in the device management protocol information.

13. The method of claim 9, further comprising:
initiating the selected device management protocol identified in the second message using bootstrap information also included in the second message.

14. The method of claim 9, wherein the selected device management protocol is one of a plurality of device management protocols selected by the bootstrap server based on the indication of the at least one device management protocol included in the first message.

15. A user terminal for accessing wireless network, the user terminal comprising:
a device management module configured to transmit at least one first message to a bootstrap server of a service provider, the first message including an indication of at least one device management protocol supported by the user terminal prior to initialization of the user terminal, and
the device management module being further configured to receive at least one second message from the bootstrap server, the at least one second message including device management protocol information,
the device management protocol information being indicative of a selected device management protocol from among the at least one device management protocol to be used by the user terminal in accessing network services,
the user terminal having not been activated for service by the service provider prior to the transmitting and receiving of the respective first and second messages.

16. The terminal of claim 15, wherein the device management protocol information includes at least one of (a) the selected device management protocol supported by the user terminal, (b) a manufacturer name, and (c) a device model identification for the user terminal.

17. The terminal of claim 15, wherein at least one of the first and second messages is a hyper-text transfer protocol message.

18. The terminal of claim 15, wherein the second message includes bootstrapping information associated with the selected device management protocol identified in the device management protocol information.

19. The terminal of claim 15, wherein the user terminal initiates the selected device management protocol identified in the second message using bootstrap information also included in the second message.

20. The terminal of claim 15, wherein the selected device management protocol identified in the second message is one of a plurality of device management protocols selected by the bootstrap server based on the device management capability information included in the first message.

* * * * *